United States Patent
Sporrer et al.

(10) Patent No.: US 11,737,385 B2
(45) Date of Patent: Aug. 29, 2023

(54) AUTOMATED IMPLEMENT LEVEL SENSING CONTROL SYSTEM OF A WORK MACHINE AND METHOD THEREOF

(71) Applicant: DEERE & COMPANY, Moline, IL (US)

(72) Inventors: Adam D. Sporrer, Huxley, IA (US); Ricky B. Theilen, Bettendorf, IA (US); Lucas B. Larsen, Ankeny, IA (US)

(73) Assignee: DEERE & COMPANY, Moline, IL (US)

( * ) Notice: Subject to any disclaimer, the term of this patent is extended or adjusted under 35 U.S.C. 154(b) by 1027 days.

(21) Appl. No.: 16/562,593

(22) Filed: Sep. 6, 2019

(65) Prior Publication Data

US 2021/0068331 A1 Mar. 11, 2021

(51) Int. Cl.
*A01B 63/00* (2006.01)
*A01B 63/16* (2006.01)
*A01B 63/24* (2006.01)

(52) U.S. Cl.
CPC ............ *A01B 63/002* (2013.01); *A01B 63/16* (2013.01); *A01B 63/24* (2013.01)

(58) Field of Classification Search
CPC ....... A01B 63/16; A01B 63/24; A01B 63/002; A01B 79/005
See application file for complete search history.

(56) References Cited

U.S. PATENT DOCUMENTS

| | | | |
|---|---|---|---|
| 6,119,786 A * | 9/2000 | Creger et al. ....... | A01B 63/1115 172/7 |
| 8,583,315 B2 * | 11/2013 | Whitehead et al. .. | G01S 5/0247 701/50 |
| 9,374,939 B2 * | 6/2016 | Pickett et al. ......... | G05D 1/021 |
| 9,554,098 B2 * | 1/2017 | Casper et al. ......... | A01B 79/00 |
| 9,609,800 B2 | 4/2017 | Henry | |
| 9,980,422 B2 * | 5/2018 | Czapka et al. ....... | A01B 59/042 |
| 2008/0195268 A1 | 8/2008 | Sapilewski et al. | |
| 2015/0156950 A1 * | 6/2015 | Henry .................. | A01B 63/002 172/664 |
| 2017/0251587 A1 | 9/2017 | Sporrer et al. | |
| 2018/0153088 A1 | 6/2018 | Sporrer et al. | |
| 2019/0126912 A1 * | 5/2019 | Peterson et al. ....... | A01B 63/22 |
| 2019/0235529 A1 * | 8/2019 | Barrick et al. ........ | A01B 63/14 |
| 2020/0178455 A1 * | 6/2020 | Ishikawa et al. .... | A01B 63/008 |

(Continued)

*Primary Examiner* — Thomas B Will
*Assistant Examiner* — Joel F. Mitchell
(74) *Attorney, Agent, or Firm* — Taft Stettinius & Hollister LLP; Stephen F. Rost (57) ABSTRACT

A method of controlling tilt of an agricultural implement being towed by a tow vehicle along a field includes providing a controller, a first sensor, a second sensor, and an actuator coupled to the implement. The method includes detecting a baseline level of the tow vehicle with the first sensor at a first location in the field, wherein the implement is located at a second location in the field spaced rearward of the first location. The controller determines when the implement will be at the first location in the field, and an implement level of the implement is measured with the second sensor once the implement is at the first location. The implement level is compared to the baseline level with the controller. The controller determines if the difference between the implement level and baseline level is within a tolerance range, and further controls the actuator as needed.

20 Claims, 8 Drawing Sheets

(56) References Cited

U.S. PATENT DOCUMENTS

2020/0221628 A1\* 7/2020 Blunier et al. ......... A01B 63/14
2020/0236835 A1\* 7/2020 Stanhope ............. A01B 79/005
2020/0344939 A1\* 11/2020 Sporrer et al. ......... A01B 41/06

\* cited by examiner

AUTOMATED IMPLEMENT LEVEL SENSING CONTROL SYSTEM OF A WORK MACHINE AND METHOD THEREOF

FIELD OF THE DISCLOSURE

The present disclosure relates to a level sensing control system, and in particular to a level sensing control system of an implement of a work machine.

BACKGROUND OF THE DISCLOSURE

In the agricultural industry, wide implements such as field cultivators and the like include a main frame and adjacent outrigger or wing frames that are hinged or pivotally coupled thereto. Conventional control systems require an operator or user to estimate how level the different frames are relative to one another, and also whether each individual frame is level in the fore-aft direction. Moreover, many of these systems require human intervention to mechanically adjust the frames to achieve a level position across the width of the machine and in the fore-to-aft direction. This, however, can introduce human error and makes it difficult to achieve precise machine leveling.

In the present disclosure, a control system is described and illustrated for sensing the machine levelness in the fore-aft and side-to-side directions and making adjustments as necessary.

SUMMARY

In one embodiment of the present disclosure, a method of controlling tilt of an agricultural implement being towed by a tow vehicle along a field includes providing a controller, a first sensor, a second sensor, and an actuator coupled to the implement; detecting a baseline level of the tow vehicle with the first sensor at a first location in the field, wherein the implement is located at a second location in the field spaced rearward of the first location; determining when the implement will be at the first location in the field; measuring an implement level of the implement with the second sensor once the implement is at the first location; comparing the implement level to the baseline level with the controller; determining if the difference between the implement level and baseline level is within a tolerance range; and controlling the actuator to adjust the implement if the implement level is not within the tolerance range.

The tolerance range may include a setpoint along with a tolerance. So, for example, the implement setpoint may be set by an operator or predefined as a factory setting. This implement setpoint may be characterized as a satisfactory difference between the implement level and the baseline level. However, there may also be a tolerance range that may be symmetrical or asymmetrical about the implement setpoint. So long as the difference between the implement level and baseline level is within the tolerance range, no action may be necessary to adjust the level of the implement.

In one example of this embodiment, the method includes not controlling the actuator if the implement level is within the tolerance range. In a second example, the method includes controlling the actuator to adjust the implement level in a fore-aft direction. In a third example, the method includes receiving feedback by the controller from another sensor to control the actuator and adjust the implement level. In a fourth example, the method includes providing a third sensor on a wing frame of the implement, the third sensor being spaced laterally from the second sensor by a defined distance; and detecting a wing frame level measurement by the third sensor at a third location when the implement is at the first location, wherein the third location is laterally offset from the first location by the defined distance. In a fifth example, the method includes comparing the wing frame level measurement to the baseline level as a function of topographical field data of the field at the third location.

In a sixth example, the topographical field data is predefined and stored by the controller. In a seventh example, the method includes providing a LIDAR sensor at a front end of the tow vehicle; detecting a topography of the field at the third location with the LIDAR sensor; and determining the topographical field data by the controller based on the topography of the field detected by the LIDAR sensor. In an eighth example, the method includes determining if the difference between the wing frame level measurement and baseline level is within a second tolerance range; and controlling a second actuator coupled to the wing frame to adjust the wing frame if the wing frame level measurement is not within the second tolerance range.

In a ninth example, the controller operably actuates the second controller to adjust a fore-aft level orientation of the wing frame. In another example, the method includes providing the implement as a multi-section implement with a main frame and a plurality of wing frames, where each of the plurality of wing frames is spaced laterally from the main frame; providing a sensor on each of the plurality of wing frames, where each of the plurality of sensors is in electrical communication with the controller; sensing a level measurement of each of the plurality of wing frames with the respective plurality of sensors; comparing the level measurement of each of the plurality of wing frames with the baseline level as a function of topographical field data of the field when the implement is at the first location; and controllably adjusting an orientation of one or more of the plurality of wing frames when the level measurement of at least one of the plurality of wing frames does not satisfy a predefined tolerance range for the at least one wing frame.

In a further example of the present embodiment, the method includes controllably moving a work tool on the implement; determining if the implement tilts forward or rearward after the work tool is moved; detecting a new implement level with the second sensor; comparing the new implement level with the baseline level; and actuating the actuator until the implement level satisfies the tolerance range.

In another embodiment of the present disclosure, a control system for controlling a level orientation of an agricultural implement being towed behind a tow vehicle includes a frame of the implement adapted to be spaced by a first distance from the tow vehicle; an actuator coupled to the implement to adjust fore-aft leveling of the implement; a first sensor configured to detect a baseline level of the tow vehicle; a second sensor configured to detect a level measurement of the implement; a controller electrically coupled to the actuator, the first sensor and the second sensor; wherein, the first sensor operably detects a baseline level of the tow vehicle and the second sensor operably detects a level measurement of the implement at the same location as the baseline level was detected; wherein, the controller compares the level measurement of the implement to the baseline level and operably controls the actuator to adjust the level of the implement to satisfy an implement setpoint.

In one example of this embodiment, the control system includes a wing frame located laterally offset from a main frame of the implement; a third sensor configured to detect a wing frame level position of the wing frame; wherein, the controller compares the wing frame level position to the baseline level and operably controls a second actuator to adjust the level of the wing frame to satisfy a second implement setpoint. In a second example, the control system includes a LIDAR sensor coupled to the tow vehicle and configured to provide topographical field data to the controller of locations laterally offset from the tow vehicle.

In a further embodiment of the present disclosure, a method of controlling a level orientation of an agricultural implement being towed by a tow vehicle along a field includes providing a controller, a first sensor, a second sensor, and an actuator coupled to the implement; detecting a baseline level of the tow vehicle with the first sensor at a first location in the field; sensing the level orientation of the implement with the second sensor at the first location; comparing the level orientation to the baseline level with the controller; and controllably actuating the actuator to adjust the level orientation of the implement if it does not satisfy an implement levelling target.

In one example of this embodiment, the method includes providing a third sensor on a wing frame of the implement, the third sensor being spaced laterally from the second sensor by a defined distance; detecting a wing frame level orientation by the third sensor at an offset location when the implement is at the first location; and comparing the wing frame level orientation to the baseline orientation as a function of topographical field data of the offset location. In a second example, the method includes controllably actuating a second actuator to adjust the wing frame level orientation of the wing frame if it does not satisfy a second levelling target.

In another example, the method includes receiving a communication by the controller from another sensor on the implement, the communication indicative of a performance level of the implement; determining if the performance level of the implement satisfies predefined performance criteria; and controllably adjusting the actuator to adjust the level orientation of the implement until the performance level of the implement satisfies the predefined performance criteria. In a further example, the method includes moving a work tool on the implement to perform a work function; sensing a profile rearward of the implement with another sensor; analysing the profile by the controller to determine if the work function is being performed satisfactorily; and controllably actuating the actuator to adjust the level orientation of the implement in a forward or rearward direction until the work function is performed satisfactorily.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

The performance of many agricultural machines such as field cultivators, planters, air seeders, and the like may be impacted by frame orientation and levelness. If a frame is not level, the performance of the machine can be negatively impacted. For instance, a tillage tool may have many factors that can impact the frame levelness in the fore-aft direction. These can be, for example, but not limited to, drawbar height, frame linkages, tire and wheel position, tire and wheel floatation variances, and change in machine settings. While individually each may not significantly change in a field setting, collectively these factors can change over time and thus impact machine performance. There may also be instances where it is desirable to alter frame position or levelness for a given field condition.

Figure 2:
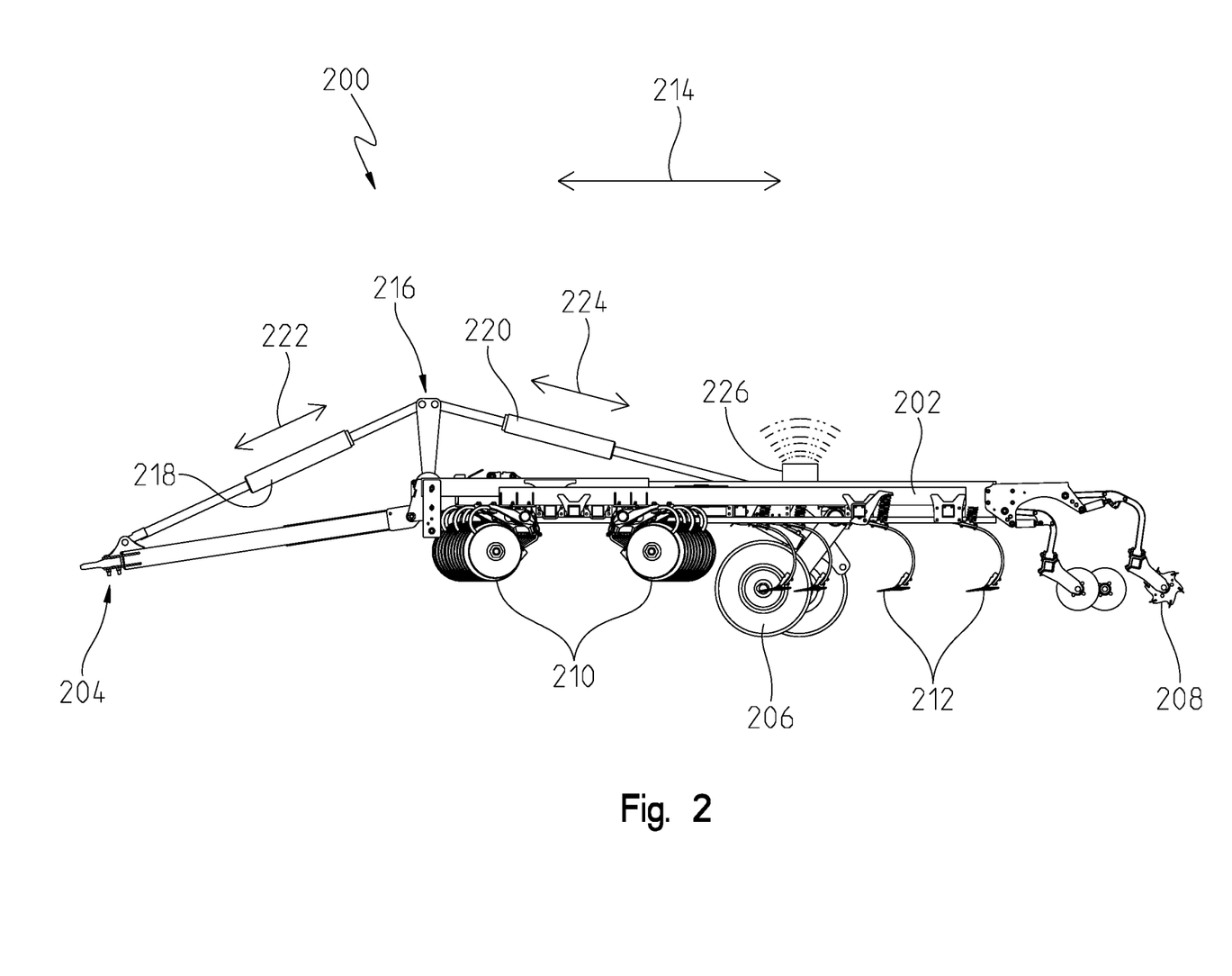
FIG. 2 is a side view of an agricultural implement.

There are conventional control systems and algorithms used for adjusting frame levelness to account for these types of changes. For instance, a user may set a frame to a level position with mechanical linkages and the levelness relationship is maintained by the frame with the linkages, frame, implement wheels, and drawbar attachment to the tractor or tow vehicle. An example of this is shown in FIG. 2 and described below. This level position is often set by a manual mechanical adjustment, although it is possible an actuator is used to provide adjustments from mechanisms such as a hydraulic selective control valve in a cab of the tow vehicle.

A different form of machine can be a floating hitch design, which is described below with reference to FIG. 3. Here, forward and rear wheels support the implement. Depth control and machine levelness may be associated with a distance from the frame of the implement to the ground. An actuator can lift the frame up and down to therefore achieve what is considered level.

The challenge with some of these aforementioned conventional systems is that measuring a front of the machine may have error due to residue on the soil and thus the system is not measuring from the exact ground surface. At the rear of the machine, interrupted soil from work tools and the like may cause the soil to be fluffier and thus offset the height of the implement from the ground. It is difficult to measure or know the offset height due to these conditions to accurately measure or control levelness of the implement. In this disclosure, one or more embodiments is presented to better sense and control implement levelness over conventional control systems.

While one or more of the embodiments may refer to a tillage implement, the present disclosure is not limited to tillage. The present disclosure may cover any agricultural implement. Moreover, it may apply to machines in the construction, forestry, and other known industries. In addition, the present disclosure may interchangeably refer to a machine or implement. The machine or implement is capable of performing a work function (e.g., tillage, planting, etc.). In at least one embodiment, the machine or implement may be towed by a tow vehicle such as a tractor.

Figure 1:
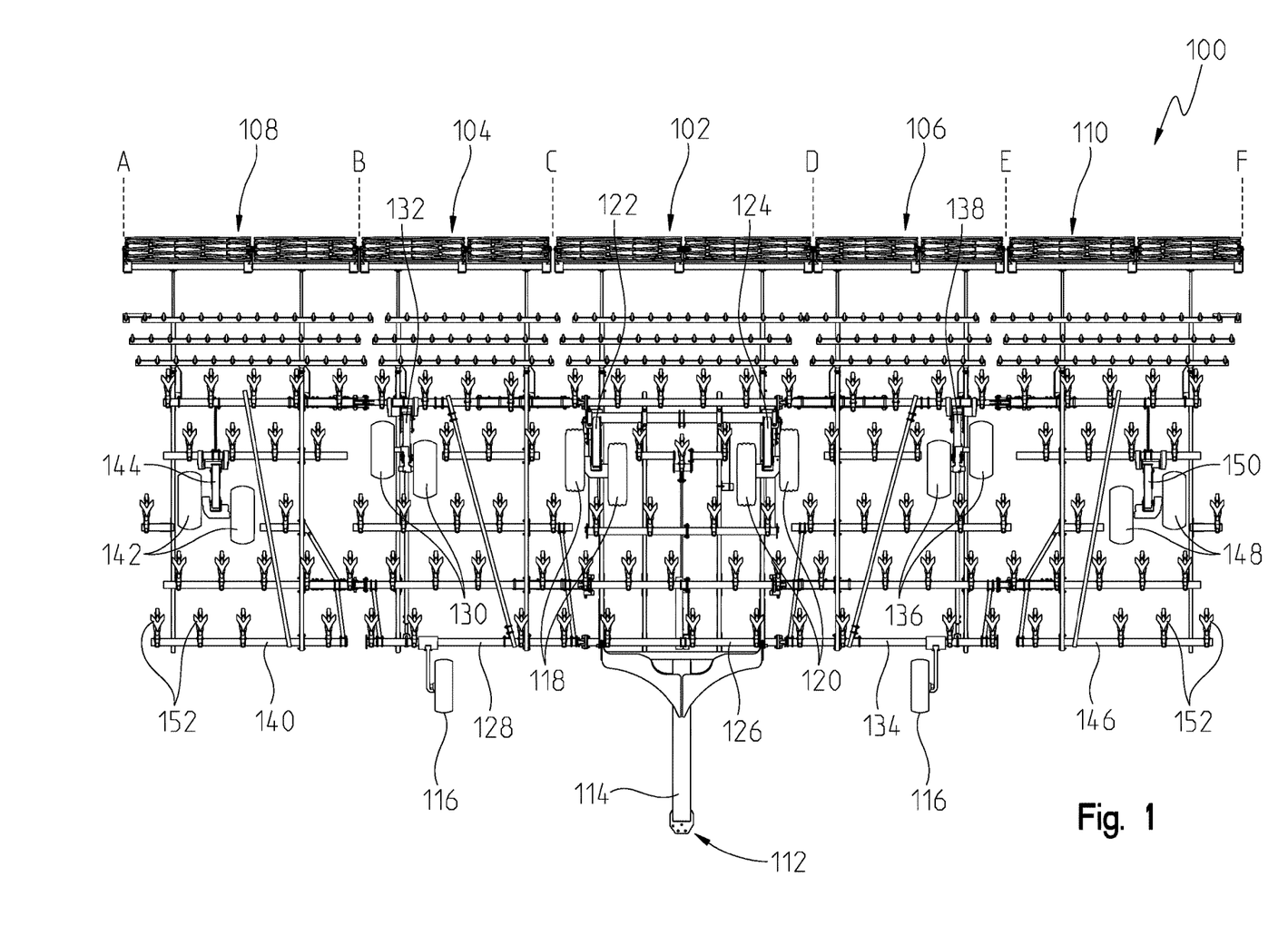
FIG. 1 is an elevated view of an agricultural implement.

Referring to FIG. 1, an example of an agricultural implement 100 such as a field cultivator is shown. The implement 100 is designed to couple to a work machine and perform a work function. For example, the implement may include work tools that penetrate into soil for aerating the soil before planting or uprooting weeds after planting. The implement 100 may be attached to a tow vehicle (not shown) by a hitch assembly 112 such as a three-point hitch or a drawbar attachment. The hitch assembly 112 includes a hitch frame member 114 that extends longitudinally in a direction of travel for coupling to the tow vehicle.

The agricultural implement 100 may include a transversely-extending frame that forms multiple frame sections. In the present disclosure, the implement may comprise a single frame section or multiple frame sections. In FIG. 1, for example, the implement 100 includes a main or center frame 102. The main frame 102 is coupled to the hitch assembly 112 as shown. A first frame section or first inner frame 104 is disposed to one side of the main frame 102, and a second frame section or second inner frame 106 is disposed to an opposite side thereof. In addition, a third frame section or first outer frame 108 is disposed to an outside of the first inner frame 104, and a fourth frame section or second outer frame 110 is disposed to an outside of the second inner frame 106. Each frame section may be pivotally coupled to the frame section adjacent thereto. The first inner frame 104, for example, may be pivotally coupled to the main frame 102 and the first outer frame 108. Similarly, the second inner frame 106 may be pivotally coupled to the main frame 102 and the second outer frame 110.

The implement 100 may be supported by a plurality of wheels. For example, a pair of front wheels 116 are coupled to the frame at a front end thereof. The main frame 102 may be supported by a first pair of wheels 118 and a second pair of wheels 120. The first inner frame 104 may be supported by a third pair of wheels 130 and the second inner frame 106 may be supported by a fourth pair of wheels 136. Likewise, the first outer frame 108 may be supported by a fifth pair of wheels 142 and the second outer frame 110 may be supported by a sixth pair of wheels 148. While each section is shown being supported by a different pair of wheels, this is only shown in the illustrated embodiment. In other embodiments, there may be only a single wheel supporting each frame section. In a different embodiment, there may be more than a pair of wheels supporting each frame section. Moreover, the implement 100 may include more than the front wheels 116. For instance, there may be back wheels disposed near the rear of the implement for additional support.

In the illustrated embodiment of FIG. 1, the agricultural implement 100 may include a plurality of actuators for controlling movement of the frame. Each actuator may be a hydraulic actuator, electric actuator, or any other known actuator. Moreover, each actuator may include an outer body or cylinder in which a rod or piston moves between an extended position and a retracted position. In FIG. 1, the main frame 102 includes a first actuator 122 and a second actuator 124. The first pair of wheels 118 may be coupled to the main frame 102 via a rock shaft (not shown) that may be hydraulically actuated by the first actuator 122. The second pair of wheels 120 may be coupled to the main frame 102 via another rock shaft (not shown) that may be hydraulically actuated by the second actuator 124. The actuators can raise or lower the main frame 102 relative to the wheels 118, 120.

The first inner frame 104 may include an actuator 132 for raising or lowering the first inner frame 104. Similarly, the second inner frame 106 may include an actuator 138 for controlling a raising or lowering movement of the second inner frame 104. The first outer frame 108 may include an actuator 144 and the second outer frame 110 may include an actuator 150. The actuator 144 may control raising and lowering of the first outer frame 108 and the actuator 150 may control raising and lowering of the second outer frame 110.

In FIG. 1, the main frame 102 includes a plurality of main frame members 126. A plurality of tools 152 may be coupled to the main frame members 126 for engaging a ground surface or soil upon which the implement travels. Similarly, the first inner frame 104 includes a plurality of first inner frame members 128, the second inner frame 106 includes a plurality of second inner frame members 134, the first outer frame 108 includes a plurality of first outer frame members 140, and the second outer frame 110 includes a plurality of second outer frame members 146. Each of these frame members may include a plurality of work tools 152 coupled thereto.

While FIG. 1 represents an illustrated embodiment of an agricultural implement with five frame sections, this disclosure is not limited to this embodiment. Other embodiments may include only one frame section. In another embodiment, the implement may include three sections with a main frame and two outer frames. Alternatively, there may be more than five frame sections in further embodiments. Thus, this disclosure is not limited to any number of frame sections, and the teachings herein may be applicable to any single or multi-section implement.

In FIG. 2 of the present disclosure, an agricultural implement 200 is shown. This implement 200 may be referred to as a level lift implement or machine. The implement 200 may include a frame 202 supported at a front end by a front hitch 204 which is selectively coupled to a tow vehicle (not shown) and at a rear end by one or more wheels 206. The implement 200 may include a finishing tool 208 at a rear end thereof along with a first work tool 210 and a second work 212.

The implement 200 may include a linkage system 216 which allows the frame 202 to maintain a level position in a fore-aft direction 214. The implement 200 may include an actuator such as a first actuator 218 and/or a second actuator 220 for adjusting the linkage system 216 and therefore change the level of the implement in the fore-aft direction 214. The first actuator 218 may actuate in a first direction 222 and the second actuator 220 may actuate in a second direction 224. Although two actuators are shown, it is possible (and likely) that the implement 200 may include only the first or second actuator to control levelness of the implement 200 in the fore-aft direction 214.

As shown in FIG. 2, the implement 200 may also include at least one sensor 226 capable of detecting a level measurement of the implement and communicating the same to a controller (not shown). In turn, the controller may operably control the actuator(s) to adjust the frame 202 to achieve a desired levelness in the fore-aft direction 214. The sensor 226 may be any type of sensor such as a rotary, Hall Effect, etc.

Figure 3:
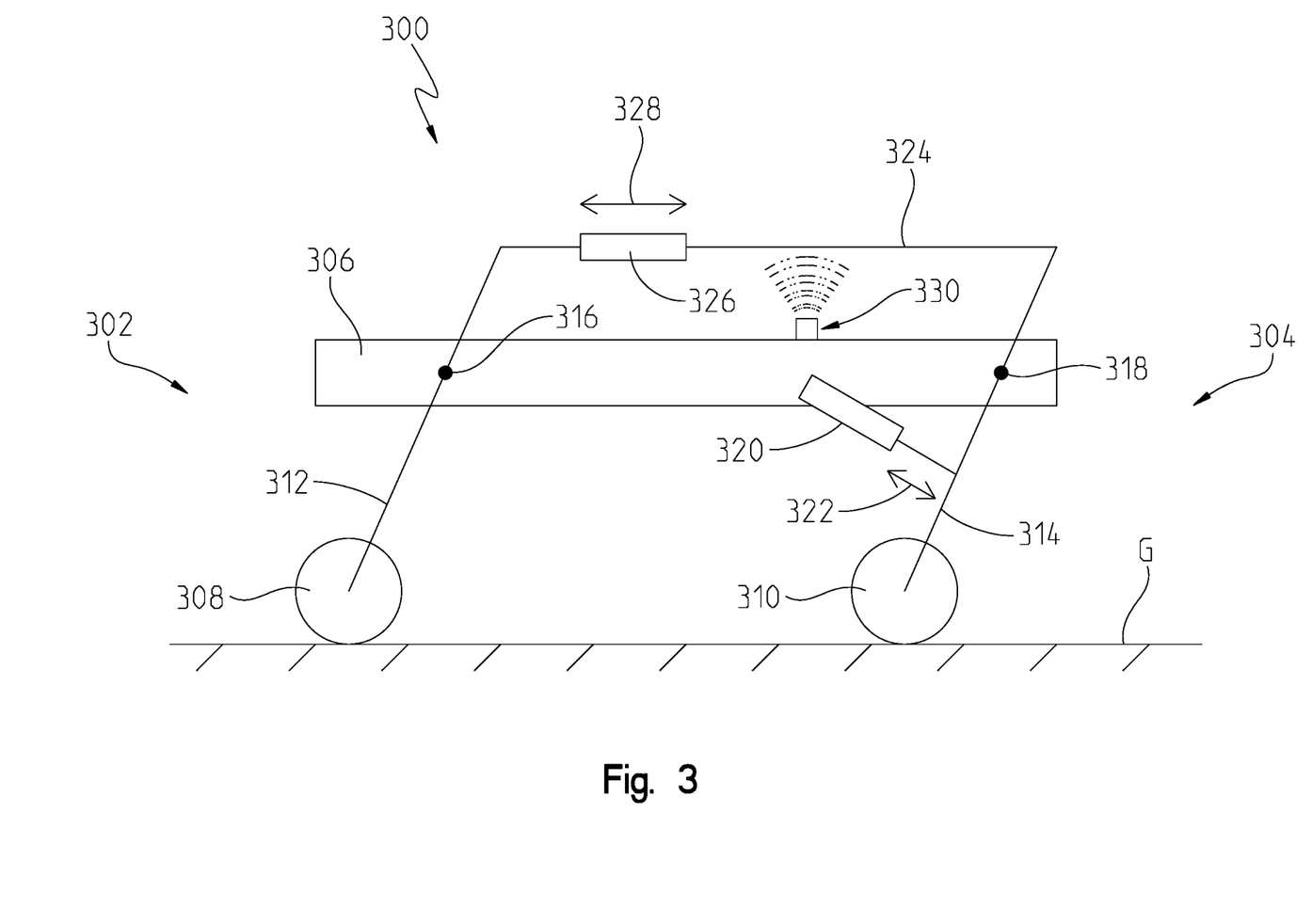
FIG. 3 is a schematic of an agricultural implement.

Referring to FIG. 3, another agricultural implement 300 is illustrated in the form of a floating hitch-style implement or machine. Here, the implement 300 or machine is shown positioned along an underlying surface or ground, G. The implement 300 may travel in a forward direction where its front end 302 faces the forward direction, and its rear end 304 is disposed at an opposite end. The implement 300 may include a front wheel 308 and a rear wheel 310 for supporting a main frame 306. A front wheel arm 312 is coupled to the front wheel 308 and pivotally coupled to the main frame 306 at a first pivot location 316. Likewise, a rear wheel arm 314 is coupled to the rear wheel 310 and pivotally coupled to the main frame 306 at a second pivot location 318.

The implement 300 may further include a linkage 324 that is connected to the front wheel arm 312 and rear wheel arm 314, as shown in FIG. 3, to adjust the height of the front end 302 of the implement 300 relative to the rear end 304. In many conventional applications, a turnbuckle is used for mechanically adjusting the linkage in the fore-aft direction. An actuator 320 may be coupled to the frame 306 and actuate in a direction indicated by arrow 322 to raise and lower the frame 306 relative to the front and rear wheels 308, 310. The turnbuckle, however, is actuated by a user or operator via a wrench to mechanically adjust the linkage.

In the agricultural implement 300 of FIG. 3, however, an actuator 326 may be used to operably adjust the linkage 324 without a user or operator having to make any mechanical adjustments. A controller (not shown) may be in electrical communication with the actuator 326 to extend or retract the actuator in a fore-aft direction 328 to adjust the linkage 324. In an alternative embodiment, the actuator may be hydraulically controlled to adjust the linkage 324. Thus, the rear actuator 320 may automatically adjust the height of the frame 306 with respect to the ground, G, and the linkage actuator 326 may pitch the implement or machine either forward or backward to achieve desirable machine levelling. In particular, the linkage actuator 326 may be actuated to adjust the length of the linkage and therefore adjust the height of the front 302 of the implement 300.

In the illustrated embodiment of FIG. 3, the implement 300 may include at least one sensor 330 capable of detecting a level measurement of the implement and communicating the same to a controller (not shown). In turn, the controller may operably control the actuator 326 to adjust the frame 306 to achieve a desired levelness in the fore-aft direction 328. The sensor 330 may be any type of sensor such as a rotary, Hall Effect, tilt, gyroscope, etc.

Figure 4:
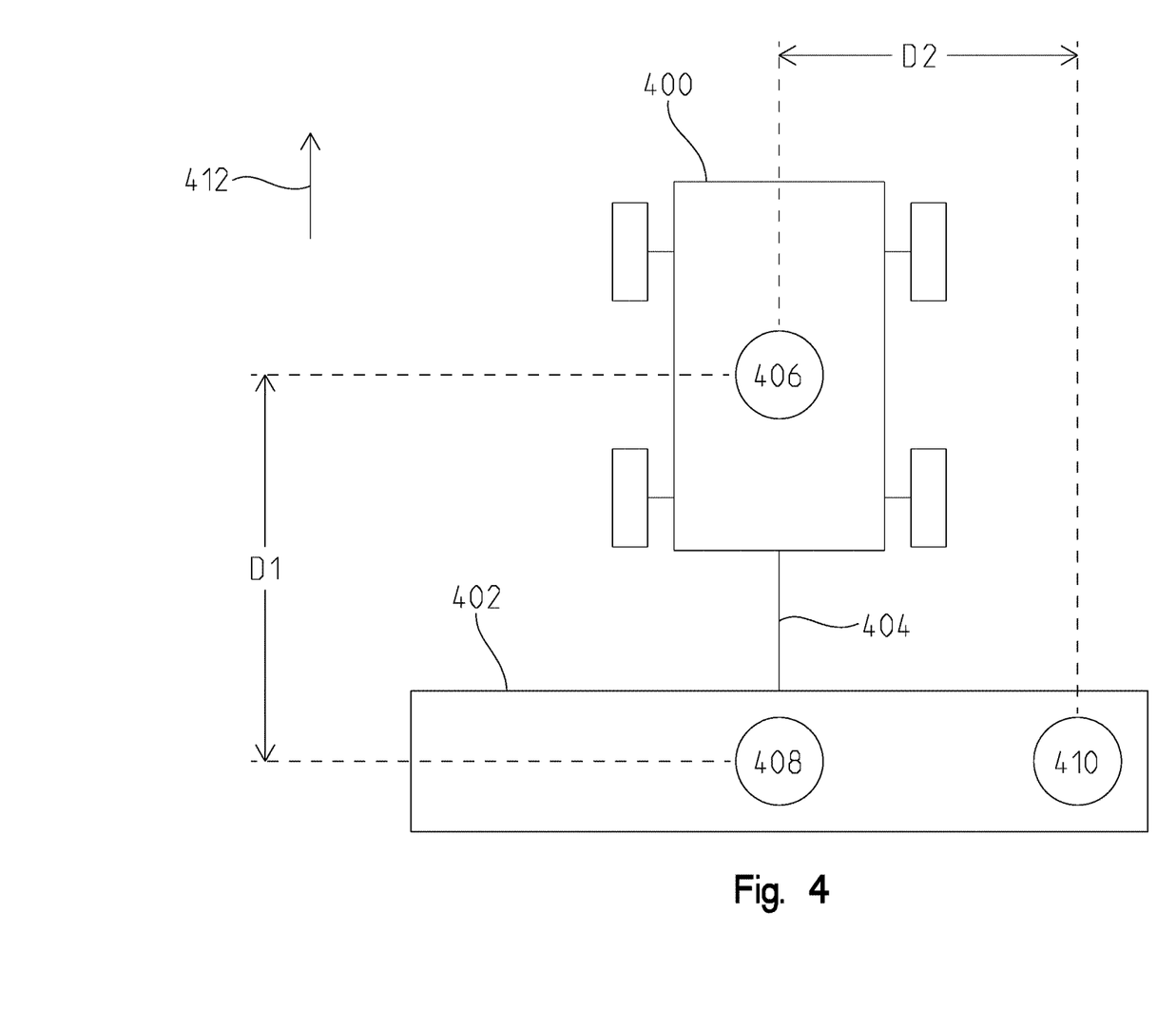
FIG. 4 is a schematic of a towing vehicle and agricultural implement.

In the present disclosure, implement levelling may be achieved in the fore-aft direction by comparing a levelness measurement taken on a tow vehicle to a levelness measurement taken on the implement. In FIG. 4, for example, the tow vehicle 400 may be a tractor pulling an agricultural implement 402 via a hitch or tow bar 404. Here, the tow vehicle 400 may be traversing a field in a forward travel direction 412. As it does, the implement 402 may follow substantially the same path travelled by the tow vehicle 400.

The implement 402 may include a single frame section or a multi-frame section. To achieve levelness in a fore-aft direction, the tow vehicle 400 may include a first sensor 406 and the implement 402 may include a second sensor 408. The distance or offset between the first sensor 406 and the second sensor 408 may be defined as D1 in FIG. 4. With the implement 402 being located directly behind the tow vehicle 400, the implement 402 is positioned to detect the same tilt and soil conditions as the tow vehicle 400. The distance between the first and second sensors and the speed of the implement 402 are known or measured. Thus, at any given location on the field, the elevation of the soil may be known as a function of the tilt measurement by the first sensor 406. As the implement 402 reaches the same point on the field, the tilt measurement taken by the second sensor 408 may be compared to the tilt measurement taken by the first sensor 406 to adjust the levelness of the implement 402.

The first and second sensors may be tilt sensors, gyroscopes, or any other sensor capable of detecting a tilt angle of the tow vehicle 400 and implement 402. During implementation of this tilt control system, it may be assumed that as the tow vehicle 400 passes over a given point in a field that it is doing so at a level plane and at a substantially constant orientation with respect to ground. This orientation may be ±1°, for example. Thus, the first sensor 406 may detect a baseline or reference tilt value at a given location in the field. The tilt measurement made by the second sensor 408 may be compared to the tilt measurement made by the first sensor 406. This may be done via a global positioning sensor (GPS) coordinate system where a GPS position in the field is known at the point where the first sensor 406 detects a given tilt value. As the implement 402 traverses the field and passes over the same point in the field, the second sensor 408 detects the tilt of the implement and this value may be compared to the baseline or reference value measured by the first sensor 406.

Alternatively, the speed and distance relationship between the tow vehicle 400 and implement 402 are known or measured, and thus from this relationship the timing of when the implement passes over the same point as the tractor (albeit at a later time) may be determined.

In some instances, it may be necessary to look ahead and adjust the implement 400 before it reaches a certain location in the field. For example, if the tow vehicle is ascending a hill and is about to reach the peak before descending, the control system of the present disclosure may be adapted to predictively adjust the level of the implement in the fore-aft direction so the implement travels over the hill (or valley) without negatively impacting the performance of the implement.

The fore-aft levelling adjustments may be carried out hydraulically, electrically, mechanically, or any other known way. The level lift implement 200 of FIG. 2 and the floating hitch implement 300 of FIG. 3 each include one or more actuators that may be used to adjust fore-aft tilt for levelling purposes. A manual linkage may be used in other implements to adjust tilt in the fore-aft direction.

In addition to fore-aft levelling, the present disclosure provides a control system capable of levelling the implement in a side-to-side or transverse direction. In FIG. 4, for example, the implement 402 may be a multi-section implement with a main frame and at least one wing frame on each side thereof. In this case, the wing frame may be spaced laterally from the main frame by a known distance. For instance, the wing frame may be pivotally coupled to the main frame as described above with respect to FIG. 1.

A third sensor 410 may be coupled to the wing frame at a lateral distance D2 from the first sensor 406 and second sensor 408. As the tow vehicle 400 travels along the field, a controller for comparing the level of the tow vehicle 400 to the implement 402 may further need to know the geographical position of the implement and tow vehicle in the field. This may be achieved with a global positioning sensor, satellite or other known technology. Moreover, once the position of the tow vehicle and implement is known in the field, a topography map may be used to reference the elevation and terrain of the field at the known position of the tow vehicle and implement. The topographical data may be used along with the offset positioning location of the third sensor 410 in order to control the level or tilt of the wing frame relative to the baseline or reference measurement taken on the tow vehicle 400.

In one example, the tow vehicle may reach a point A in the field. At this location, the main frame of the implement 402 may be located at point B directly behind point A by offset distance D1, and the wing frame may be located at point C which is laterally offset from point B by distance D2. The controller (not shown) may reference topographical data from a topography map of the field to know what the levelness of the field is at each location. If there is an elevation change between points B and C, the topographical data provides this input to the controller and the sensors 408, 410 may be used to further determine if the main frame and wing frame are at a desired level.

In another embodiment, the control system may utilize Light Detection and Ranging (LIDAR) technology to detect changes in terrain as the tow vehicle and implement traverse a field. LIDAR is a known technology that measures distance to a target by illuminating the target with laser light and measuring the reflected light with a sensor. A LIDAR sensor may be coupled to a front end of the tow vehicle for measuring forward of the tow vehicle and maps the topography laterally offset from the tractor. This data may be stored so the controller is able to use the data as the implement reaches different locations in the field. The LIDAR detected data may be used instead of or in conjunction with topographical data from a topography map.

In the event of a multi-section implement, each frame section may include a sensor for detecting tilt of the respective frame section. On a floating hitch implement such as the one in FIG. 3, each section may tilt forward or rearward via its own fore-aft actuator. On a level lift implement, its fore-aft actuator or actuators may be used to control fore-aft tilt to achieve a desired levelness of each frame section.

A controller may control the individual actuators based on tilt sensing by each of the sensors. The controller may be located on the tow vehicle, the implement, or remotely. The controller may be in electrical communication with each sensor, including the LIDAR sensor if applicable, and operably adjust each actuator to maintain a desired implement level. Pre-mapped topography data may be stored in the controller or communicated to it via a remote controller or control system. Alternatively, the controller may use sensing from the LIDAR sensor to map the topography of the field as the tow vehicle and implement traverse the field.

Figure 5:
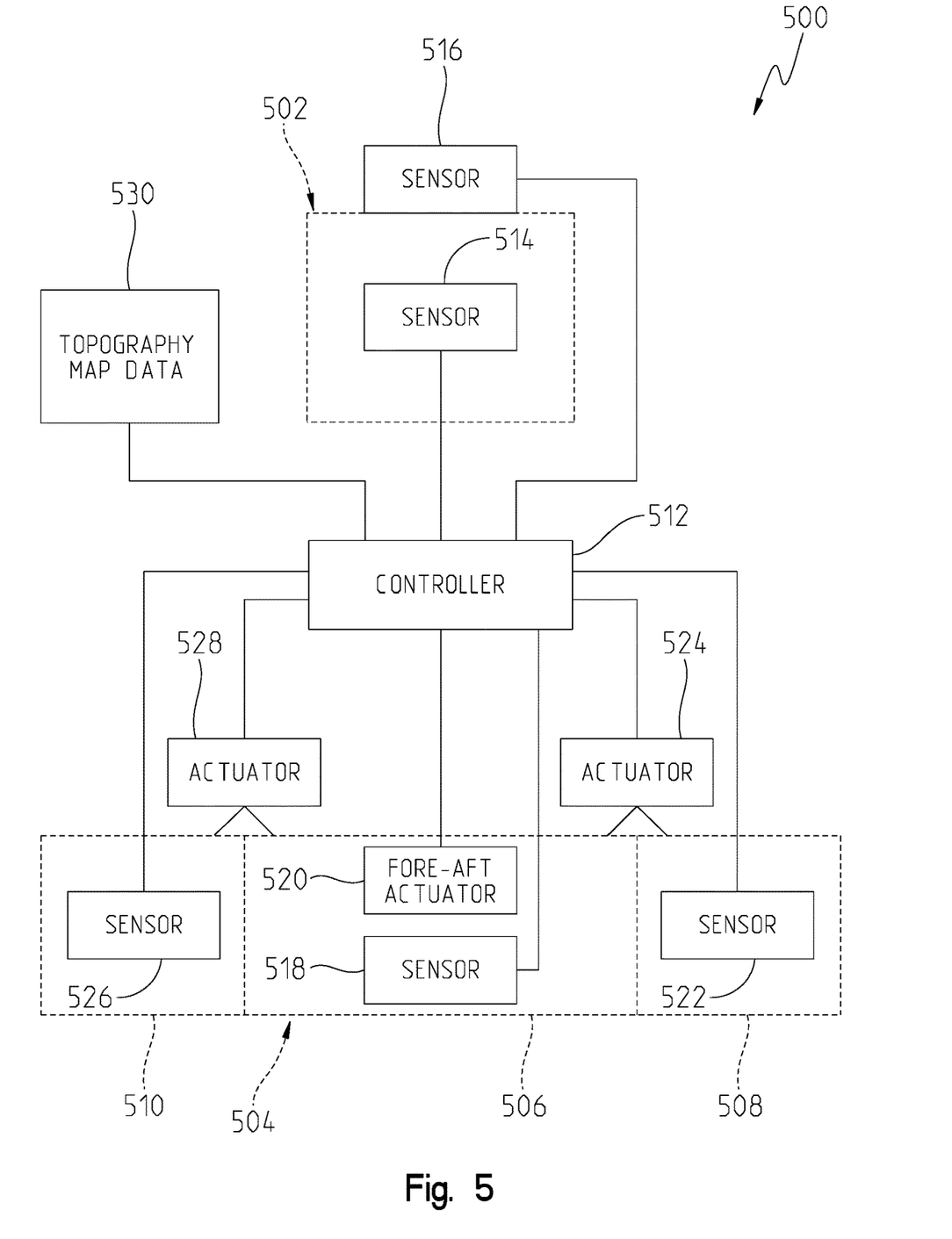
FIG. 5 is a schematic of a control system of a work machine and agricultural implement.

An example of a control system according to the present disclosure is illustrated in FIG. 5. The control system 500 may include a controller 512 that is able to control or maintain a level position of an agricultural implement 504 being towed by a tow vehicle 502. The implement 504 may be a multi-section implement including a main or center frame 506, a first wing frame 508 and a second wing frame 510. The first wing frame 508 may be located on one side of the main frame 506 and the second wing frame 510 may be located on the opposite side thereof. As such, the two wing frames flank the two sides of the main frame 506.

The tow vehicle 502 may include a first tilt sensor 514 or gyroscope capable of detecting a level position of the tow vehicle 502. The first tilt sensor 514 may be in electrical communication with the controller 512. As the first tilt sensor 514 detects a tilt or level measurement of the tow vehicle 502, it may communicate the same to the controller 512. In turn, the controller 512 may use the detected measurement as a baseline or reference measurement to control the implement levelling.

The implement 504 may include a plurality of sensors for sensing a tilt or level position of each respective frame section thereof. For instance, the main frame 506 may include a second tilt sensor 518 disposed in electrical communication with the controller 512. Likewise, the first wing frame 508 may include a third tilt sensor 522 in electrical communication with the controller. Moreover, the second wing frame 510 may include a fourth tilt sensor 526 disposed in electrical communication with the controller 512.

The controller 512 may include a memory for storing data such as a topography map data 530. A processor of the controller 512 may then execute control logic to adjust the tilt position of the implement 504 to achieve a desired levelling orientation.

The tow vehicle 502 may be equipped with a LIDAR sensor 516 located at a front end thereof for scanning an area in front of the tow vehicle 502. The LIDAR sensor 516 may be in electrical communication with the controller 512 as well.

The controller 512 may be located on the tow vehicle 502 or implement 504. In one embodiment, the controller 512 may be located remote from the tow vehicle 502 and implement 504. In another embodiment, the controller 512 may comprise two or more controllers.

The implement 504 may include one or more fore-aft actuators 520 for adjusting the front or rear of the implement to achieve a desired levelling orientation. A first actuator 524 and a second actuator 528 may operably adjust side-to-side or lateral levelling of the outer wing frames. Each wing frame may include its own fore-aft actuator 520 and lateral-adjusting actuator. Similarly, the main frame 506 may include its own actuator for adjusting side-to-side levelling. While only two side-to-side or lateral actuators are shown, it is within the scope of the present disclosure that there may be at least one such actuator on each frame section of the implement 504.

The controller 512 may be in communication with each actuator and thus control movement of each actuator to achieve a desired levelling. The controller 512 may include control logic for operably adjusting each actuator precisely.

Before addressing control logic, the present disclosure also contemplates adjusting or controlling implement levelling when another feature or component of the tow vehicle or implement is adjusted. This may be true even when the implement is at a nominal and level orientation as desired. For example, a rolling basket or other finishing tool 208 may be adjusted upward or downward in the field. As this is done, this may alter or adjust the positioning of the rear of the implement either up or down, thereby creating a forward or rearward pitch in the fore-aft direction.

In one instance, the finishing tool may be hydraulically raised. As this happens, the finishing tool effectively is cantilevered from the rear of the implement which provides additional downward weight on the rear and creates a rearward pitch on the fore-aft of the implement. On the other hand, if the finishing tool is lowered to engage the soil, it can provide lift to the rear end of the implement, thereby creating a forward pitch on the fore-aft of the implement. In this latter example, lowering the finishing tool effectively transfers weight and lifts the rear of the machine since there is no rear wheel on the implement (see FIG. 3). Thus, as other machine settings change, it is possible the controller may detect these changes and either learn or be programmed to adjust the implement in the fore-aft direction to counter these changes. In other words, the controller may be programmed to auto-compensate for other machine functions and how these functions may impact implement levelness in the fore-aft direction.

Figure 6:
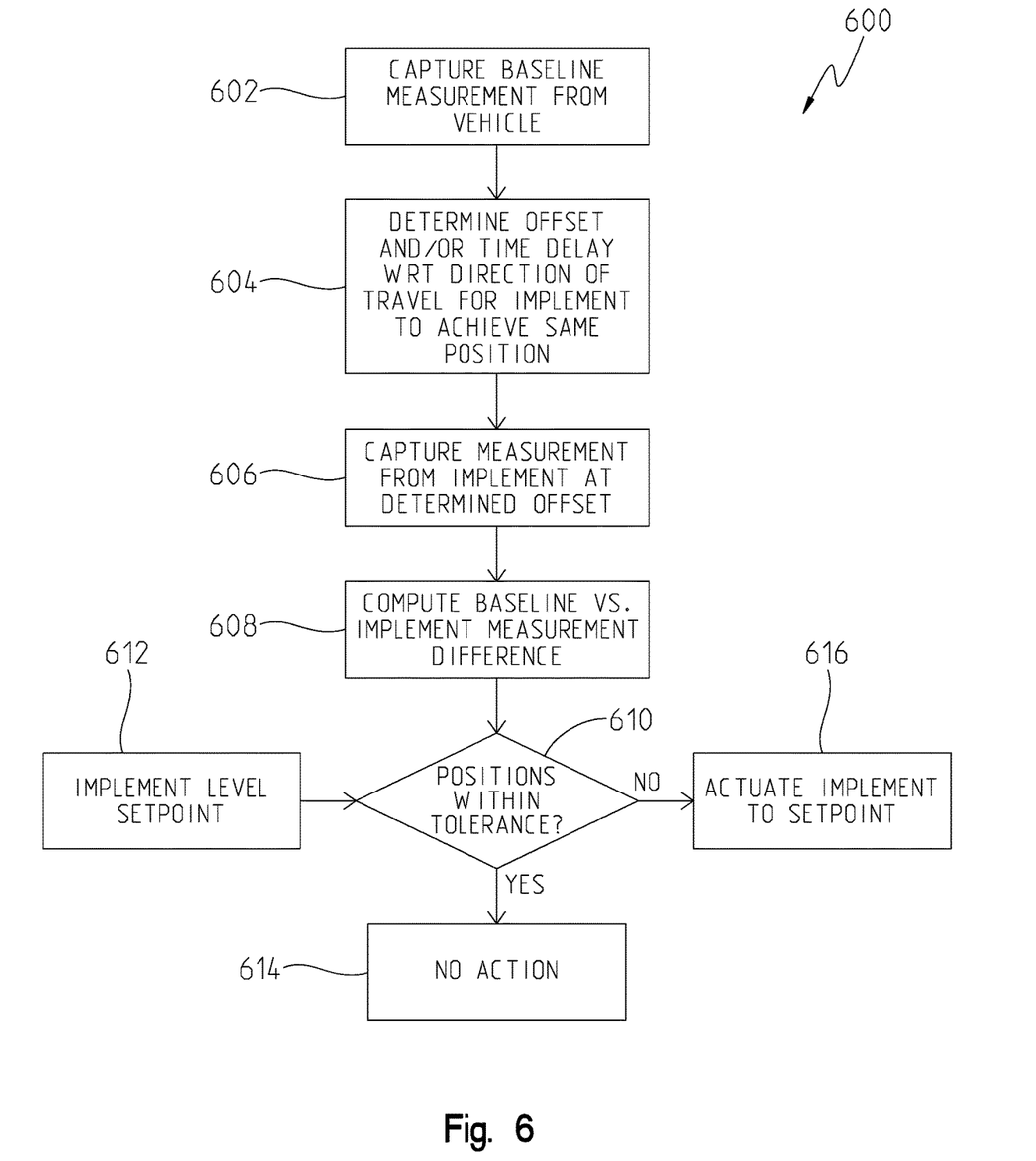
FIG. 6 is a flow diagram of a first embodiment for controlling levelness of an agricultural implement.

Referring now to FIG. 6, a first embodiment of control logic which may be executed by the control system described above is shown. In FIG. 6, a method 600 of controlling the level of an agricultural implement is provided. The method 600 may include a plurality of blocks or steps executed by a controller 512. While the blocks or steps are shown in a specific order in FIG. 6, it is to be understood that these blocks or steps may be arranged in a different order and still achieve the same result. Moreover, there may be fewer or additional blocks or steps in a similar method.

In a first block 602 of the method 600, the controller 512 may receive a baseline level measurement from a first sensor 514 on a tow vehicle 502. The tow vehicle 502 may be pulling an agricultural implement 504 through a field to perform a desired work function (e.g., tilling, planting, etc.). The baseline level measurement may be taken by the first sensor 514 at a given point A in the field.

At the moment the baseline level measurement is taken at point A, the tow vehicle 502 and implement 504 may be travelling in a forward travel direction in the field. The implement 504 may be located at a point B in the field, where point B is a distance D1 rearward of point A (see FIG. 4, for example). In a second block 604, the controller 512 may determine the offset distance or time delay with respect to the direction of travel of the implement when the implement reaches point A. The distance, D1, may be a known distance and either communicated to or stored by the controller 512. With the distance D1 known, the controller 512 may receive speed information from another sensor or otherwise detect it based on a known method. With the speed and distance of the implement known, the controller 512 can determine when (e.g., how long) the implement 504 will be at point A.

As the implement 504 reaches point A, the controller 512 may receive an implement level measurement from a second sensor 518 in block 606. Once the controller 512 receives the implement level measurement in block 606, it may compare the implement level measurement to the baseline level measurement in block 608. As it does, the control logic may include a tolerance level in which the difference between the baseline level measurement and implement level measurement must satisfy. This tolerance may be predefined and the controller 512 may retrieve that information in block 612. In block 610, the controller 512 may compare the difference to the tolerance and determine if the implement level measurement is within the desired tolerance of the baseline level measurement. If it is, then the method advances to block 614 and no action is taken. However, if the implement level measurement is not within the desired tolerance of the baseline level measurement, then the controller 512 may actuate the fore-aft actuator 520, for example, of the implement 504 to adjust the implement level until it is within the desired tolerance.

In the embodiment of FIG. 6, the controller 512 is configured to operably adjust the level position of the implement 504 at a location directly behind or rearward of the tow vehicle 502. In other words, the main frame 506 of the implement 504 may be levelled based on the control logic in FIG. 6.

Figure 7:
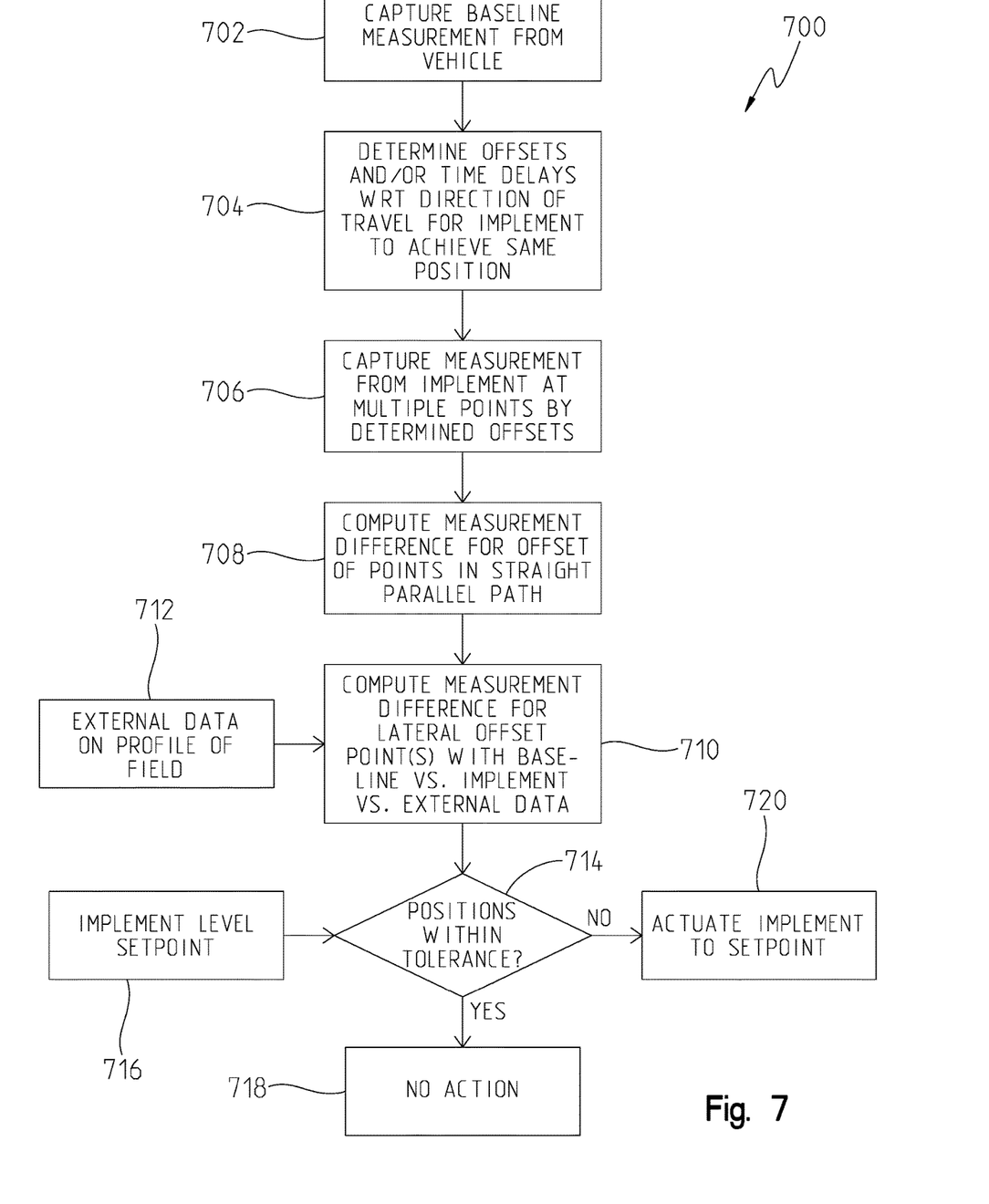
FIG. 7 is a flow diagram of a second embodiment for controlling levelness of an agricultural implement.

In FIG. 7, another embodiment of control logic is shown in which the level of a wing frame of an agricultural implement may be sensed and adjusted. Here, a method 700 for sensing and controlling a level position of an agricultural implement at a location laterally offset relative to the direction of travel is provided. Similar to the method 600 of FIG. 6, the method 700 may include a plurality of blocks or steps for controlling the level position of the offset wing frame. The illustrated blocks or steps may be arranged in different orders than what is shown in FIG. 7, and there may be fewer or additional blocks or steps in other similar embodiments.

In a first block 702 of the control method, the controller 512 may receive a baseline level measurement from a first sensor 514 on a tow vehicle 502. The tow vehicle 502 may be pulling the agricultural implement 504 through a field to perform a desired work function (e.g., tilling, planting, etc.). The baseline level measurement may be taken by the first sensor 514 at a given point A in the field.

At the moment the baseline level measurement is taken at point A, the tow vehicle 502 and implement 504 may be travelling in a forward travel direction in the field. The implement 504 may be located at a point B in the field, where point B is a distance D1 rearward of point A (see FIG. 4, for example). For purposes of this embodiment, the implement 504 may be a multi-section implement having a main frame 506 and a pair of wing frames 508, 510. In this embodiment, the main frame 506 may be located at point B when the tow vehicle 502 is at point A. At this same time, the first wing frame 508 may be located at point C, where point C is laterally offset from point B by a distance D2 (see FIG. 4).

In a second block 704, the controller 512 may determine the offset distance or time delay with respect to the direction of travel of the implement 504 when the implement reaches point A. The distance, D1, may be a known distance and either communicated to or stored by the controller 512. With the distance D1 known, the controller 512 may receive speed information from another sensor or otherwise detect it based on a known method. With the speed and distance of the implement known, the controller 512 can determine when (e.g., how long) the implement 504 will be at point A.

As the implement 504 reaches point A, the controller 512 may execute block 706 by collecting level measurement data from one or more tilt sensors on the implement. In particular, a third sensor 522 on the first wing frame 508 may sense the level thereof and communicate the same to the controller 512. A fourth sensor 526 may also communicate a level measurement of the second wing frame 510 to the controller 512. In each instance, the known lateral offset distance from the location of each measurement is known or determined by the controller 512.

In block 708, the controller 512 may determine a difference between the baseline level measurement and the implement level measurement taken by the second sensor 518. In other words, in block 708, the controller 512 may compare the level measurements of the tow vehicle to the main frame 506 at the same location A in the field.

The controller 512 may be configured to access external topography data in block 712 of the field at various locations thereof and in particular at the lateral offset distances of the wing frames relative to point A. This external data may be stored in a memory unit of the controller 512 or communicated to the controller 512 by a remote source. In any event, in block 710, the controller 512 may compare the respective wing frame offset level measurement sensed by either sensor 522, 526 to the implement level measurement sensed by the second sensor 518. The topography of the field may be accounted for at the lateral offset distance of each wing frame based on the external topography data.

The control logic may include a tolerance level in which the difference between the baseline level measurement and wing frame level measurement must satisfy. This tolerance may be predefined as setpoints, and the controller 512 may retrieve this information in block 716. In block 714, the controller 512 may compare the difference between the baseline level measurement and wing frame level measurement to the tolerance and determine if the wing frame level measurement is within the desired tolerance of the baseline level measurement. If it is, then the method advances to block 718 and no action is taken. However, if the implement level measurement is not within the desired tolerance of the baseline level measurement, then the controller 512 may actuate an actuator 524, 528 (or other fore-aft implement) on the wing frame to adjust the wing frame level position until it is within the desired tolerance.

The control logic of FIGS. 6 and 7 may be executed at the same time to ensure that the entire implement is levelled according to a desired levelling target. Moreover, the methods may be repeatedly executed as often as necessary.

In the present disclosure, the level setpoints may be established according to different means. For instance, in a first example, level setpoints may be user defined where the operator enters what is a desired level of the implement during operation. In this case, the operator may input the desired or target level position or setpoint of the implement into a control or display in a cab of the tow vehicle or elsewhere. Regardless of where the operator sets the level target, the controller operably controls the different actuators and maintains the implement at this level target or setpoint. This open loop control continuously monitors the orientation of the implement via the different sensors and adjusts the actuators to maintain the orientation of the implement at the target or setpoint.

A second open loop control is when a level setpoint or target is predefined as a default setting in the control logic. Here, a factory setting may establish the level setpoint and the control system continuously adjusts the orientation of the implement based on this level setpoint. In this example, it may be possible for the operator to make adjustments to the level setpoint or target.

In a third example, the control logic may function as a closed loop control. Here, other sensing mechanisms of the tow vehicle or implement may communicate with the controller to operably adjust the level orientation of the implement. For instance, an external sensor may detect a performance characteristic of the implement and provide feedback of this performance to the controller. The feedback may be to adjust the orientation of the implement to achieve better performance, or the controller may interpret the feedback and determine that adjustments to the orientation of the implement would achieve better performance. An example of this is shown in FIG. 8.

Figure 8:
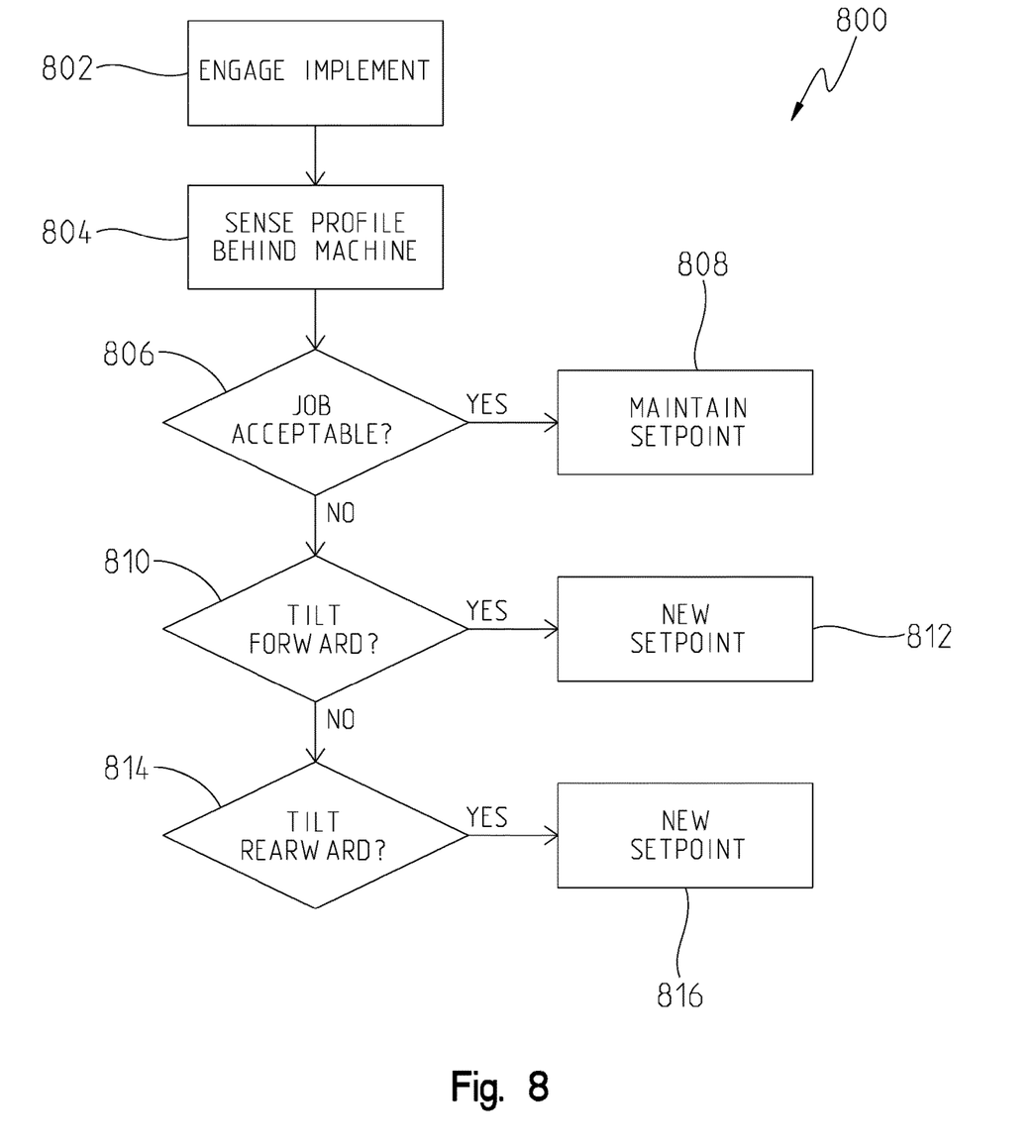
FIG. 8 is a flow diagram of a third embodiment for controlling levelness of an agricultural implement.

In FIG. 8, a control method 800 executable by the controller is illustrated. In a first block or step 802, the implement may be operating at a level setpoint which is user defined, predefined, or determined in another manner. As such, a working tool such as the finishing tool 208 in FIG. 2 may be engaged to perform a work function (e.g., tilling, planting, fertilizing, etc.) in a field. The implement may be equipped with optical sensors or other sensing technology to detect the performance of the work tool. In block 804, for example, the sensing technology may detect a profile rearward of the implement. This may include scanning an area behind the implement as it travels in the forward travel direction.

The sensing technology may detect whether the performance of the finishing tool (or other work tool) is satisfactory in block 806. The sensing technology may also communicate feedback to the controller and the controller may determine if the performance is satisfactory. In either case, if the work performance is satisfactory, then in block 808 the controller may maintain the level setpoint of the control logic.

In the event the performance is determined to be unsatisfactory in block 806, the method 800 advances to block 810 where the controller determines whether to tilt the implement forward or to block 814 where the controller determines whether to tilt the implement rearward. If the implement is adjusted forward, then in block 812 a new level setpoint is set by the controller to replace the original setpoint. If, on the other hand, the implement is adjusted rearward in block 814, the controller may set a new setpoint in block 816. Once a new setpoint is established, the controller may receive level measurements from the different sensors and operably adjust the orientation of the implement based on the new setpoint.

As previously described, various types of sensors and sensing technologies may be used for implement levelling. These may include ultrasonic, optical, radar, and laser. Position sensors such as potentiometers and hall effect sensors may be used. Alternatively, a gyroscope or tilt sensor may be positioned on each frame section such that an angle of the section may be calculated with respect to other sections of the machine or implement. As such, the height of one section may be determined based on the height of another. Other similar technologies may be used for achieving a level machine or implement across its width and in the fore-aft direction.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A method of controlling tilt of an agricultural implement being towed by a tow vehicle along a field, comprising:
   providing a controller, a first sensor, a second sensor, and an actuator coupled to the implement;
   detecting a baseline level of the tow vehicle with the first sensor at a first location in the field, wherein the implement is located at a second location in the field spaced rearward of the first location;
   determining when the implement will be at the first location in the field;
   measuring an implement level of the implement with the second sensor once the implement is at the first location;
   comparing the implement level to the baseline level with the controller;
   determining if a difference between the implement level and baseline level is within a tolerance range; and
   controlling the actuator to adjust the implement if the difference between the implement level and the baseline level is not within the tolerance range.

2. The method of claim 1, further comprising not controlling the actuator if the difference between the implement level and the baseline level is within the tolerance range.

3. The method of claim 1, further comprising controlling the actuator to adjust the implement level in a fore-aft direction.

4. The method of claim 1, further comprising receiving feedback by the controller from another sensor to control the actuator and adjust the implement level.

5. The method of claim 1, further comprising:
   providing a third sensor on a wing frame of the implement, the third sensor being spaced laterally from the second sensor by a defined distance; and
   detecting a wing frame level measurement by the third sensor at a third location when the implement is at the first location, wherein the third location is laterally offset from the first location by the defined distance.

6. The method of claim 5, further comprising comparing the wing frame level measurement to the baseline level as a function of topographical field data of the field at the third location.

7. The method of claim 6, wherein the topographical field data is predefined and stored by the controller.

8. The method of claim 6, further comprising:
providing a LIDAR sensor at a front end of the tow vehicle;
detecting a topography of the field at the third location with the LIDAR sensor; and
determining the topographical field data by the controller based on the topography of the field detected by the LIDAR sensor.

9. The method of claim 6, further comprising:
determining if the difference between the wing frame level measurement and baseline level is within a second tolerance range; and
controlling a second actuator coupled to the wing frame to adjust the wing frame if the difference between the wing frame level measurement and the baseline level is not within the second tolerance range.

10. The method of claim 9, wherein the controller operably actuates the second actuator to adjust a fore-aft level orientation of the wing frame.

11. The method of claim 1, further comprising:
providing the implement as a multi-section implement with a main frame and a plurality of wing frames, where each of the plurality of wing frames is spaced laterally from the main frame;
providing a sensor on each of the plurality of wing frames, where each of the plurality of sensors is in electrical communication with the controller;
sensing a level measurement of each of the plurality of wing frames with the respective plurality of sensors;
comparing the level measurement of each of the plurality of wing frames with the baseline level as a function of topographical field data of the field when the implement is at the first location; and
controllably adjusting an orientation of one or more of the plurality of wing frames when the level measurement of at least one of the plurality of wing frames does not satisfy a predefined tolerance range for the at least one wing frame.

12. The method of claim 1, further comprising:
controllably moving a work tool on the implement;
determining if the implement tilts forward or rearward after the work tool is moved;
detecting a new implement level with the second sensor;
comparing the new implement level with the baseline level; and
actuating the actuator until the implement level satisfies the tolerance range.

13. A control system for controlling a level orientation of an agricultural implement being towed behind a tow vehicle, comprising:
a frame of the implement adapted to be spaced by a first distance from the tow vehicle;
an actuator coupled to the implement to adjust fore-aft leveling of the implement;
a first sensor configured to detect a baseline level of the tow vehicle;
a second sensor configured to detect a level measurement of the implement;
a controller electrically coupled to the actuator, the first sensor and the second sensor;
wherein, the first sensor operably detects a baseline level of the tow vehicle and the second sensor operably detects a level measurement of the implement at the same location as the baseline level was detected;
wherein, the controller compares the level measurement of the implement to the baseline level and operably controls the actuator to adjust the level of the implement to satisfy an implement setpoint.

14. The control system of claim 13, further comprising:
a wing frame located laterally offset from a main frame of the implement;
a third sensor configured to detect a wing frame level position of the wing frame;
wherein, the controller compares the wing frame level position to the baseline level and operably controls a second actuator to adjust the level of the wing frame to satisfy a second implement setpoint.

15. The control system of claim 14, further comprising a LIDAR sensor coupled to the tow vehicle and configured to provide topographical field data to the controller of locations laterally offset from the tow vehicle.

16. A method of controlling a level orientation of an agricultural implement being towed by a tow vehicle along a field, comprising:
providing a controller, a first sensor, a second sensor, and an actuator coupled to the implement;
detecting a baseline level of the tow vehicle with the first sensor at a first location in the field;
sensing the level orientation of the implement with the second sensor at the first location;
comparing the level orientation to the baseline level with the controller;
controllably actuating the actuator to adjust the level orientation of the implement if it does not satisfy an implement levelling target.

17. The method of claim 16, further comprising:
providing a third sensor on a wing frame of the implement, the third sensor being spaced laterally from the second sensor by a defined distance;
detecting a wing frame level orientation by the third sensor at an offset location when the implement is at the first location;
comparing the wing frame level orientation to the baseline orientation as a function of topographical field data of the offset location.

18. The method of claim 17, further comprising controllably actuating a second actuator to adjust the wing frame level orientation of the wing frame if it does not satisfy a second levelling target.

19. The method of claim 16, further comprising:
receiving a communication by the controller from another sensor on the implement, the communication indicative of a performance level of the implement;
determining if the performance level of the implement satisfies predefined performance criteria; and
controllably adjusting the actuator to adjust the level orientation of the implement until the performance level of the implement satisfies the predefined performance criteria.

20. The method of claim 16, further comprising:
moving a work tool on the implement to perform a work function;
sensing a profile rearward of the implement with another sensor;

analyzing the profile by the controller to determine if the work function is being performed satisfactorily;
controllably actuating the actuator to adjust the level orientation of the implement in a forward or rearward direction until the work function is performed satisfactorily.

* * * * *